United States Patent

Herrmann et al.

[15] 3,651,339

[45] Mar. 21, 1972

[54] FEEDBACK CLIPPER

[72] Inventors: Donald Charles Herrmann, Hartsville, Pa.; Lucas John Bazin, Stratford, N.J.

[73] Assignee: RCA Corporation

[22] Filed: Apr. 22, 1970

[21] Appl. No.: 30,642

[52] U.S. Cl. ....................307/237, 178/7.3 S, 307/310, 307/317, 328/162, 328/171, 330/29, 330/86, 330/103, 330/110

[51] Int. Cl. ....................H03k 5/08

[58] Field of Search ....................307/237, 310, 317; 328/162, 328/163, 171, 172; 178/7.3 S, 7.5 S; 330/29, 86, 96, 97, 103, 100, 110

[56] References Cited

UNITED STATES PATENTS

| | | | |
|---|---|---|---|
| 3,398,298 | 8/1968 | Baun | 307/237 X |
| 3,261,991 | 7/1966 | Lash | 328/162 X |
| 3,005,918 | 10/1961 | Judkins | 307/317 X |

FOREIGN PATENTS OR APPLICATIONS

| | | | |
|---|---|---|---|
| 1,287,121 | 1/1969 | Germany | 330/29 |

OTHER PUBLICATIONS

Schumacher; Amplifier With Nonlinear Automatic Gain Control, I.B.M. Technical Disclosure Bulletin, Feb. 1965, p. 847

*Primary Examiner*—Stanley T. Krawczewicz
*Attorney*—Eugene M. Whitacre

[57] ABSTRACT

An amplifier including first and second stages and a feedback loop has an output terminal coupled to a temperature compensated clipping circuit. A signal appearing at the amplifier output terminal and approaching a predetermined clipping level causes a diode in the clipping circuit to conduct. The conduction of the diode alters the feedback to the amplifier such that the altered gain of the amplifier compensates for the nonlinear conduction characteristics of the clipping diode whereby the signal is linearly translated until clipping occurs.

5 Claims, 4 Drawing Figures

Figure 1:
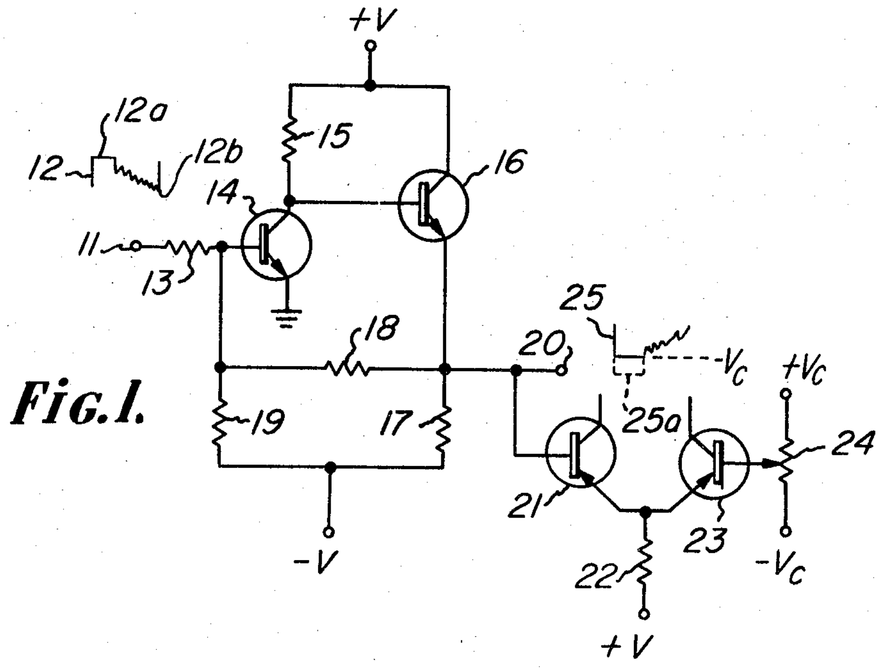

INVENTORS
Donald C. Herrmann &
Lucas J. Bazin
BY Eugene M. Whitacre
ATTORNEY

FEEDBACK CLIPPER

BACKGROUND OF THE INVENTION

In many situations it is desirable to limit the peak amplitude of an electrical signal. In a television system it is necessary to control the peak amplitude of video signals so that the component parts of the composite television signal are within the requirement specified by the FCC. In the processing of video signals obtained from a television camera it is customary to add a blanking signal to the video during horizontal line retrace time and to clamp the blanked portion of the signal to a reference potential. This reference potential may be called the black level and the video signal extends from this reference black level up to a specified white level. The blanked and clamped video signal is then coupled to a clipping stage which limits the signal at the black level so that no blacker-than-black video signal portions exist. The signal obtained from the clipper is then coupled to a gamma circuit in which the black level of the video signal is amplified or stretched relative to the white level to compensate for the inherent nonlinearity of the reproducing picture tube in a television receiver.

In order for the gamma circuit to properly alter the signal according to a selected power law, it is essential that the stage driving the gamma circuit is linear. Therefore, it is necessary that none of the signal processing stages between the image pickup tube and the gamma circuit contribute nonlinearity to the video signal. Of particular concern is the nonlinearity which the clipper stage may add to the video signal. Particularly in transistorized signal processing apparatus nonlinearity may be caused by the nonlinear conducting characteristics of semiconductor devices. One common method of clipping a video signal to a predetermined reference potential has been to pass the video signals through a stage including a semiconductor diode which is biased to conduct at a predetermined clipping level, below which the signal is clipped to eliminate all components of the signal which exceed the clipping level. A difficulty encountered in this common clipping arrangement is introduced by the nonlinear conducting characteristics of the clipping diode in the region where it first starts to conduct and clip. This nonlinear characteristic is imparted to the video signal passed through the clipper stage and is present in the video signal coupled to the gamma stage. The gamma stage does not correct for this undesirable signal nonlinearity in the black region and hence the processed video signal coupled to the encoder and transmitter contains any undesired nonlinearity introduced by the clipper stage. A television receiver receiving the transmitted signal applies the signal containing the undesirable nonlinearity to the television picture tube in which the undesired nonlinearity results in an erroneous reproduction of the gray scale values of the video signal.

An object of this invention is to provide a clipper which linearly translates a signal until the signal reaches a predetermined clipping level.

Another object of this invention is to provide a clipper utilizing a feedback amplifier in conjunction with a clipping circuit.

An amplifier including a feedback path is coupled to a clipping circuit including a clipping diode having an undesirable nonlinear conduction characteristic. As the level of signals obtained from the amplifier approaches the clipping level the clipping diode conducts, altering the feedback and gain of the amplifier such that the nonlinear characteristic of the clipping diode is compensated by the change in gain of the amplifier whereby the signal is linearly translated by the clipper until the signal reaches the clipping level.

A more detailed description of the invention will be given in the following specification and accompanying drawing of which:

FIG. 1 is a circuit diagram of a clipper according to the invention; and

Figures 2A, 2B, 2C:
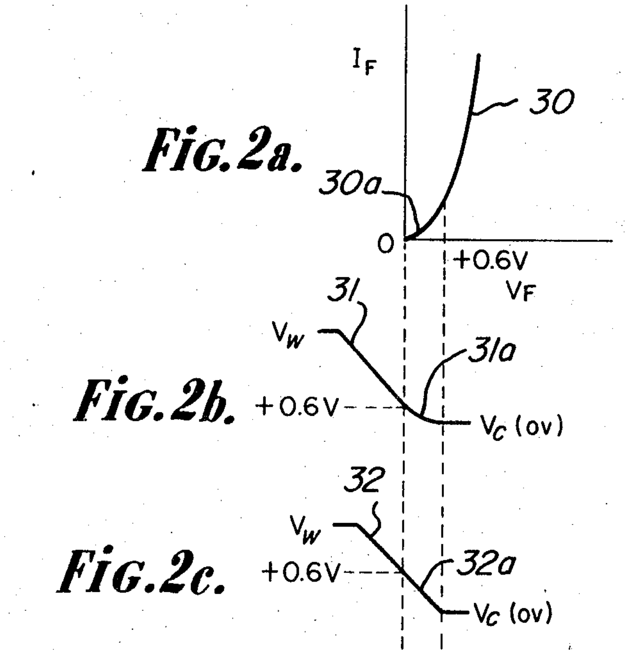

FIGS. 2*a*, 2*b* and 2*c* are diagrams showing the effect of nonlinearity and linearity correction of the clipped signal obtained from the clipper shown in FIG. 1.

DESCRIPTION OF THE INVENTION

FIG. 1 is a circuit diagram of a clipper embodying the invention. A source of signals is coupled to an input terminal 11 and through a resistor 13 to the base electrode of a transistor 14. The signals may be a television video signal as represented by the waveform 12. Waveform 12 is a video signal having a positive black representative portion **12*a* and a negative white representative portion 12*b*. Black portion 12*a* of the video signal has been clamped at a reference potential and has been blanked previously to being coupled to input terminal 11. A collector electrode of transistor 14 is coupled to the base electrode of transistor 16, the collector is also coupled through a load resistor 15 to a source of positive potential +V. The base electrode of transistor 14 is coupled through a resistor 19 to a source of negative potential −V. The emitter electrode of transistor 14 is coupled to ground. Transistor 14 is connected as a common emitter amplifier. Collector electrode of transistor 16 is coupled to the source of positive potential +V, the emitter electrode of transistor 16 is coupled to a signal output terminal 20 and through a resistor 17 to a source of negative potential −V. Transistor 16 is connected as an emitter follower stage. A feedback resistor 18 is coupled between the emitter electrode of transistor 16 and the base electrode of transistor 14. Thus, transistors 14 and 16** are connected as a feedback pair.

Coupled to output terminal 20 is a matched pair of transistors 21 and 23 for supplying temperature compensated clipping voltage for the clipper circuit. Output terminal 20 is coupled to the base electrode of transistor 21 the emitter electrode of transistor 21 is coupled to the emitter electrode of transistor 23 and through a resistor 22 to a source of positive potential +V. The base electrode of transistor 23 is coupled to a wiper arm of a potentiometer 24. Potentiometer 24 is coupled to the positive and negative sources of clipping potential $+V_C$ and $-V_C$. For purposes of explaining the invention, the clipping potential at the wiper arm of potentiometer 24 will be regarded as 0 volts but it is to be understood that any voltage may be selected by adjusting the wiper arm of potentiometer 24. The collector electrodes of transistors 21 and 23 are not connected in the circuit, thus the base emitter junction of transistors 21 and 23 are utilized as a pair of matched diodes. It is to be understood that a pair of matched diodes may be substituted for the pair of matched transistors 21 and 23.

The purpose of utilizing matched transistors 21 and 23 is to provide temperature compensation for the change in $V_{BE}$. Thus, when a temperature change causes a drop in voltage across the emitter base junction of transistor 23 this change is cancelled by an equal and opposite change across the emitter base junction of transistor 21. With 0 volt potential applied to the base of transistor 23 its emitter will be at approximately 0.6 volts. Likewise, the emitter of transistor 21 will be at 0.6 volts, therefore, it can be seen that the emitter base junction of transistor 21 will start to conduct when the base electrode is at +0.6 volts and will be in full conduction when the base is at 0 volts. Thus, 0 volts is the potential at which video signals appearing at output terminal 20 will be clipped thereby preventing any signal excursion more negative than 0 volts.

In operation the video signals coupled to transistor 14 will be amplified and inverted at its collector electrode. The amplified and inverted signal is coupled through emitter follower transistor 16 and appears at output terminal 20 with the black signal negative and white signal positive. Waveform 25 illustrates a video signal appearing at output terminal 20. A dotted line in the waveform indicated the clipping level, $V_C$ which is 0 volts. The waveform portion **25*a*** is that portion of the signal below the clipping level and which portion is removed by the action of the clipper.

When the video signal appearing at output terminal 20 is above the clipping potential of 0 volts, feedback is provided from transistor 16 through feedback resistor 18 to the base electrode of transistor 15. Thus the feedback of the two stages is determined by the ratio of resistor 18 to resistor 13.

As the video signal approaches the clipping potential from a positive level the base emitter junction of transistor 21 will start to conduct when the video signal is at +0.6 volts. As transistor 21 starts to conduct it provides a low impedance for the video signal and current is supplied through the emitter base junction of transistor 21 to the junction of resistor 17 and feedback resistor 18, decreasing the current supplied through the emitter of transistor 16. Thus there is less feedback supplied from transistor 16 to transistor 14 and the gain of transistor 14 increases. As the signal approaches and reaches the clipping potential of 0 volts, transistor 21 becomes fully conducting, supplying all of the current to the junction of resistor 17 and 18, thereby cutting off transistor 16. At this point the signal is clipped. As the signal coupled to transistor 16 rises above 0 volts transistor 16 will begin to conduct and transistor 21 will cut off, thereby establishing the normal feedback loop between transistors 16 and 14. The effect of the feedback in conjunction with the clipping transistor 21 will be described in conjunction with FIGS. 2*a*, 2*b* and 2*c*. FIG. 2*a* illustrates the conducting characteristic 30 of a diode such as formed by the base emitter junction of transistor 21. As the junction becomes forward biased the diode starts to conduct in a nonlinear manner, this nonlinear conduction existing until the diode is fully forward biased at which point the conduction becomes substantially linear. The nonlinear portion of the characteristic curve is indicated by the portion 30*a* of curve 30.

FIG. 2*b* illustrates the effect of nonlinear clipping diode on a video waveform 31. Video waveform 31 is shown having the positive portion thereof representative of the white signals. The negative portion of the waveform is to be clipped at a potential $V_C$. In a conventional clipping circuit this waveform is clipped by a diode and the nonlinear conducting characteristics of the diode as it becomes fully forward biased appears on the video waveform. This nonlinearity is illustrated by waveform portion 31*a*. As previously described, this undesirable nonlinearity imparted to the video waveform results in a distortion of the signals at the black level.

FIG. 2*c* illustrates a waveform 32 obtained from output terminal 20. It is to be noted that the waveform portion 32*a* is linear from the point of start of conduction of base emitter junction of transistor 23 until it is fully conducting. As described above, the nonlinear conducting characteristics of the emitter base junction of transistor 21 is compensated by the increasing gain of transistor 14 as the feedback loop between transistors 16 and 14 is opened as the video signals approach the clipping level. As the feedback decreases and the gain of transistor 14 increases towards its open loop gain, the gain is determined by the ratio of load resistor 15 to the emitter-base resistance of transistor 14. The video signal is increasingly amplified at the black level near the clipping region. This increase in signal amplification is effected to overcome the nonlinear effects at the base emitter junction of transistor 21 whereby the feedback pair provides linear translation of the video signal at all levels down to the clipping level potential.

What is claimed is:

1. A clipping circuit for preventing a peak level of a signal from exceeding a predetermined level, comprising:

an amplifier including first and second stages for amplifying a signal applied to said first stage;

feedback means coupled between said first stage and a signal output terminal of said second stage for controlling the gain of said amplifier; and clipping means including a semiconductor device coupled to a source of potential at said predetermined level coupled to said feedback means for altering said feedback and the gain of said amplifier as said peak signal level approaches said predetermined level for effecting linear translation of said signal until said predetermined clipping level is reached.

2. A clipping circuit according to claim 1 wherein said clipping means comprises a diode biased to conduct at said predetermined level.

3. A clipping circuit according to claim 1 wherein said clipping means comprises a pair of matched diodes having a first of their respective electrodes coupled together, a source of clipping potential at said predetermined level coupled to a second electrode of one of said diodes and a second electrode of the other of said diodes coupled to said feedback means for effecting a constant predetermined clipping potential over a range of temperature.

4. A clipper, comprising:

an amplifier including first and second transistors having a feedback path between a signal output electrode of said second transistor and a signal input electrode of said first electrode; and a clipping circuit including first and second diodes having a first of their respective electrodes coupled together and through a resistor to a source of potential, a second electrode of said second diode coupled to a source of clipping potential and a second electrode of said first diode coupled to said signal output electrode of said second transistor whereby a signal appearing at said signal output electrode and having a peak voltage level equal to or exceeding said clipping potential causes said first diode to conduct and alter the feedback of said amplifier such that said signal is linearly translated by said amplifier until said peak signal voltage level reaches said clipping potential.

5. A clipper for limiting a peak level of video signals applied thereto, comprising:

an amplifier including feedback means for controlling the gain of said amplifier; and clipping means including a semiconductor diode coupled to an output terminal of said amplifier and to said feedback means, said diode being biased to conduct as a signal obtained from said amplifier approaches a predetermined clipping level such that the conduction of said diode alters the amount of said feedback for altering the gain of said amplifier for compensating for the nonlinear conduction characteristic of said diode, whereby said signal is linearly translated by said clipper until said signal reaches said predetermined clipping level.

* * * * *